United States Patent [19]
Franchere et al.

[11] Patent Number: 5,285,907
[45] Date of Patent: Feb. 15, 1994

[54] MODULAR TUBE RACK ARRAYS

[75] Inventors: Larry A. Franchere, Sparta; Douglas P. Henderson, Morristown, both of N.J.

[73] Assignee: Becton, Dickinson and Company, Franklin Lakes, N.J.

[21] Appl. No.: 884,661

[22] Filed: May 14, 1992

[51] Int. Cl.⁵ .................................... A47F 5/00
[52] U.S. Cl. ....................... 211/74; 211/194
[58] Field of Search ............... 211/74, 194, 189, 60.1; 312/107, 108

[56] References Cited

U.S. PATENT DOCUMENTS

| | | | |
|---|---|---|---|
| 3,375,934 | 4/1968 | Bates | 211/74 X |
| 3,379,315 | 4/1968 | Broadwin | 211/74 X |
| 3,390,783 | 7/1968 | Quachenbush, Jr. | 211/74 X |
| 4,093,076 | 6/1978 | Newton | 211/74 |
| 4,099,626 | 7/1978 | Magnussen, Jr. | 211/194 X |
| 5,036,989 | 8/1991 | Carilli | 211/74 |

Primary Examiner—Alvin C. Chin-Shue
Assistant Examiner—Sarah A. Lechok
Attorney, Agent, or Firm—Nanette S. Thomas

[57] ABSTRACT

This invention involves racks or tray arrays for use in clinical laboratories, in particular, to support tubes and other containers holding body fluid specimens. The invention allows the user to "build" racks or arrays of larger and/or smaller capacity, depending upon the user's requirements, by rapid snapping together of a plurality of identical modular tube units. The racks or units may have a variety of size openings for accommodating different size specimen containers, and containers of different configuration. Thus, the user can maintain stable support of a great many containers simultaneously for handling in the laboratory, thus avoiding the danger of dropping or spilling specimens. The arrangements of the invention may be comprised of reusable, autoclavable moldable plastic materials, or less expensive throw away moldable materials. The individual components making up the tube rack array may be of a variety of geometric configurations.

10 Claims, 6 Drawing Sheets

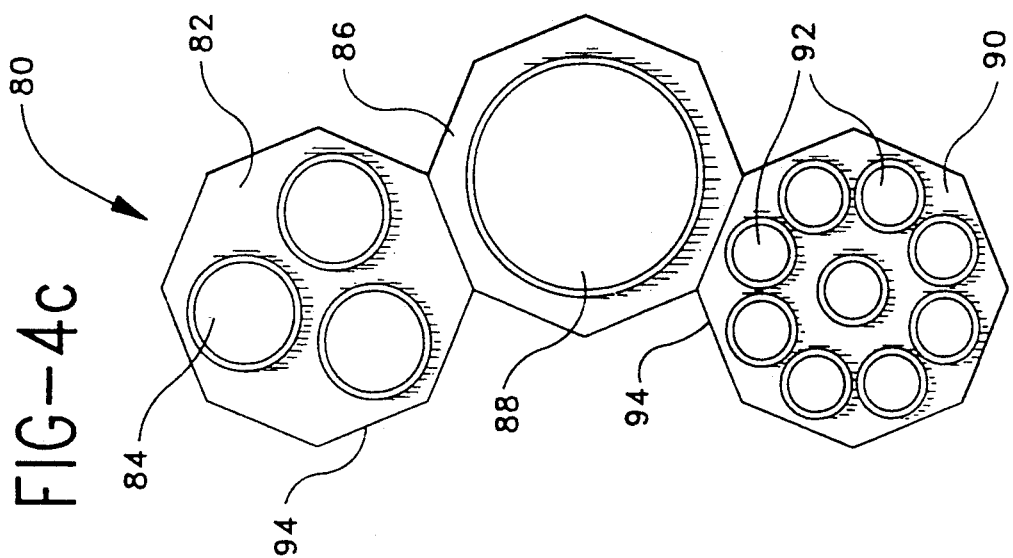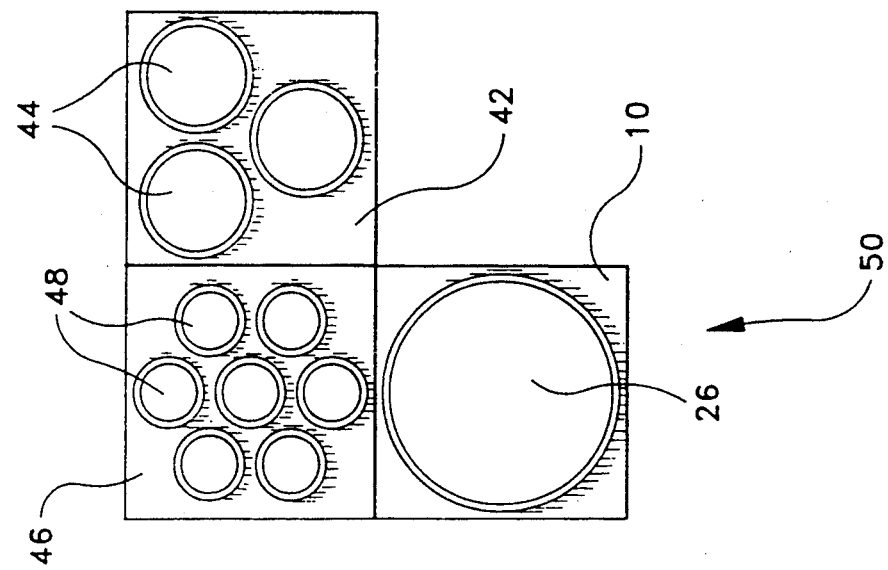

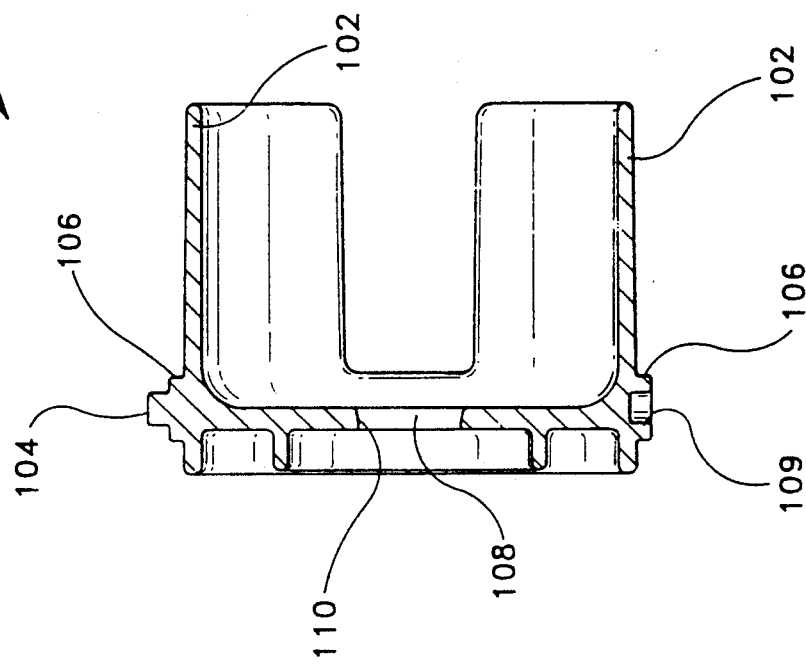
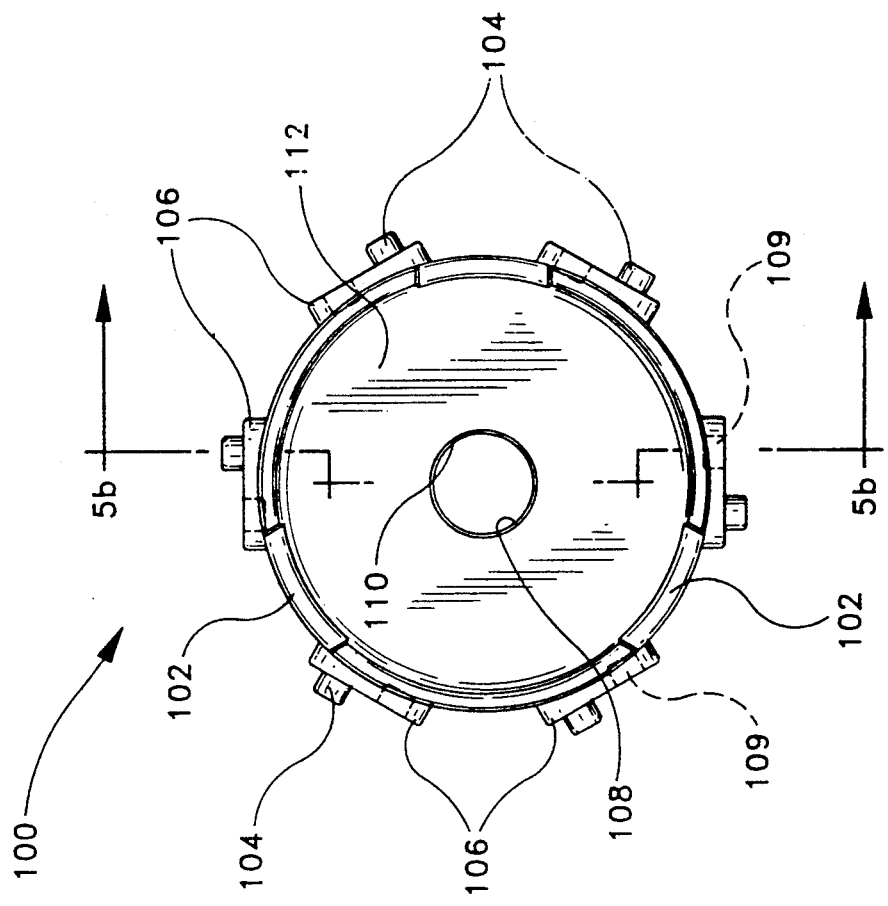

MODULAR TUBE RACK ARRAYS

BACKGROUND OF THE INVENTION

Field of the Invention

This invention relates to rack arrays or arrangements for supporting a variety of different sizes and configurations of body fluid specimen containers or tubes in a clinical laboratory environment. More particularly, this invention relates to individual components of such an array which may be joined together to provide a greater or lesser amount of capacity for storing and/or holding in an upright manner a plurality of tubes of the kind discussed above.

As will be understood, in the present environment of infectious diseases, it has become important to take body fluid specimens to a great degree from many patients, whether or not they may be patients in a hospital or simply in a clinical laboratory for an examination. Because of the huge increase in examinations for such infectious diseases such as AIDS, and hepatitis, many tubes and/or containers are accumulated in a clinical laboratory in a short period of time for examination of the specimens contained in those tubes and/or containers. Because of this, it becomes most important to be able to arrange such tubes and/or containers in a stationary and or storage arrangement until such time as the specimen contained in the containers can be examined.

Moreover, in certain instances, the containers need to be exposed for a period of time to increased temperature levels and a specifically controlled environment to develop the cells in a specimen taken from an individual patient. In some instances, the support trays or arrays of the invention allow for the exposure of a larger quantity of such tubes and/or containers in a closed environment under certain temperature conditions in order to enhance the development and/or improvement of the specimen for subsequent examination.

Because of this great increase in the number of such specimen containers, it becomes most important for the laboratory technician to be able to quickly arrange for the support of large quantities of such containers or tubes which arrive in the laboratory for handling. In many instances, these tubes may be of a variety of different dimensions. Some have a conical bottom so that the tubes will not stand alone. Thus, with the invention here, the technician may join together a plurality of modular units in a single array or arrangement for accommodating, for example, tubes having conical bottoms and having a diameter of, for example, 12 mm. up to, perhaps, 61 mm.

With the arrangement herein, all of these varieties of tubes or other containers may be held and supported for handling simultaneously for subsequent examination or exposure to whatever activity is required in order to examine or otherwise treat the specimens contained in the container. Again, while the general arrangement of the modular unit making up the arrangement or array of the invention is universal in its general size and application, the unit may be joined together with other units by the end user in a "mix and match" arrangement to accommodate the differing size of tubes and/or containers involved. The modular racks are also arranged to, as discussed above, accommodate containers with a conical bottom surface or the containers may be flat bottomed or round. Finally, the modular arrangements of the invention, which may be joined together in an appropriately desired array or arrangement for container support, may be comprised of materials which are autoclavable in the laboratory. That is, once they have been used and contaminated, they may be autoclaved for disposal. Alternatively, if desired and/or required because of the specimen character involved, the units may be comprised of a cost effective a material which may be discarded after each use.

Other objects and advantages of this invention will be apparent from the following description, the accompanying drawings and the appended claims.

DESCRIPTION OF THE DRAWINGS

FIGS. 4a, 4b and 4c illustrate in plan view various representative arrays which may be developed in accordance with the invention and specifically illustrating a variety of geometric configurations of modular units available according to the invention;

FIG. 5a is a top plan view illustrating a round modular unit form of the invention for supporting a single container;

FIG. 5b is a sectional view taken along lines 5b—5b of FIG. 5a;

DETAILED DESCRIPTION OF THE INVENTION

Figure 1:
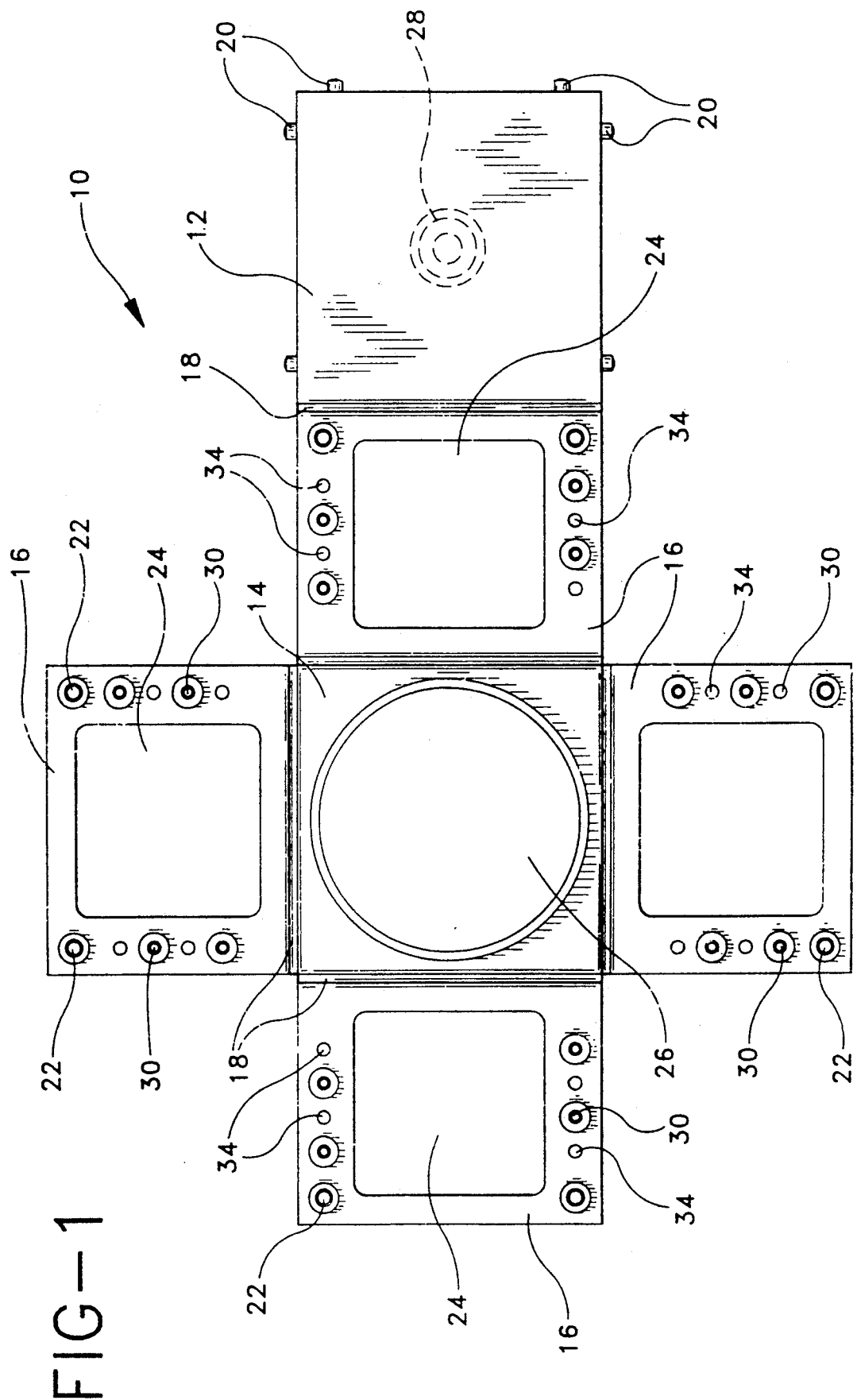
FIG. 1 is a top plan view of a modular unit illustrating one form of the invention in its non-erected flat form.

Referring to the drawings in which like reference characters refer to like parts throughout the several views thereof, FIG. 1 illustrates, in plan view, one representative modular unit of the invention in its flat non erected form. Thus, modular unit generally designated 10 has a bottom surface or wall 12, four side panels 16, and a top panel 14. The panels are joined together by living hinges 18 which may be utilized to fold the panels around each other to form a rectangular modular unit such as that shown in FIG. 2. The various panels of unit 10 are snapped together by buttons 20 received in holes 22 for that purpose.

Bottom panel 12 includes a seat 28 for receiving the rounded bottom surface of a container sitting in the modular unit 10. Opening 26 in the top surface 14 of the modular unit, once it is erected receives the container. It will be understood by practitioners-in the art, that the opening 26 may be varied in diameter depending upon the dimension of the container to be supported in the modular unit 10. "Living hinge" 18 may be replaced by conventional hinges as will be understood by practitioners in the art.

Figure 2:
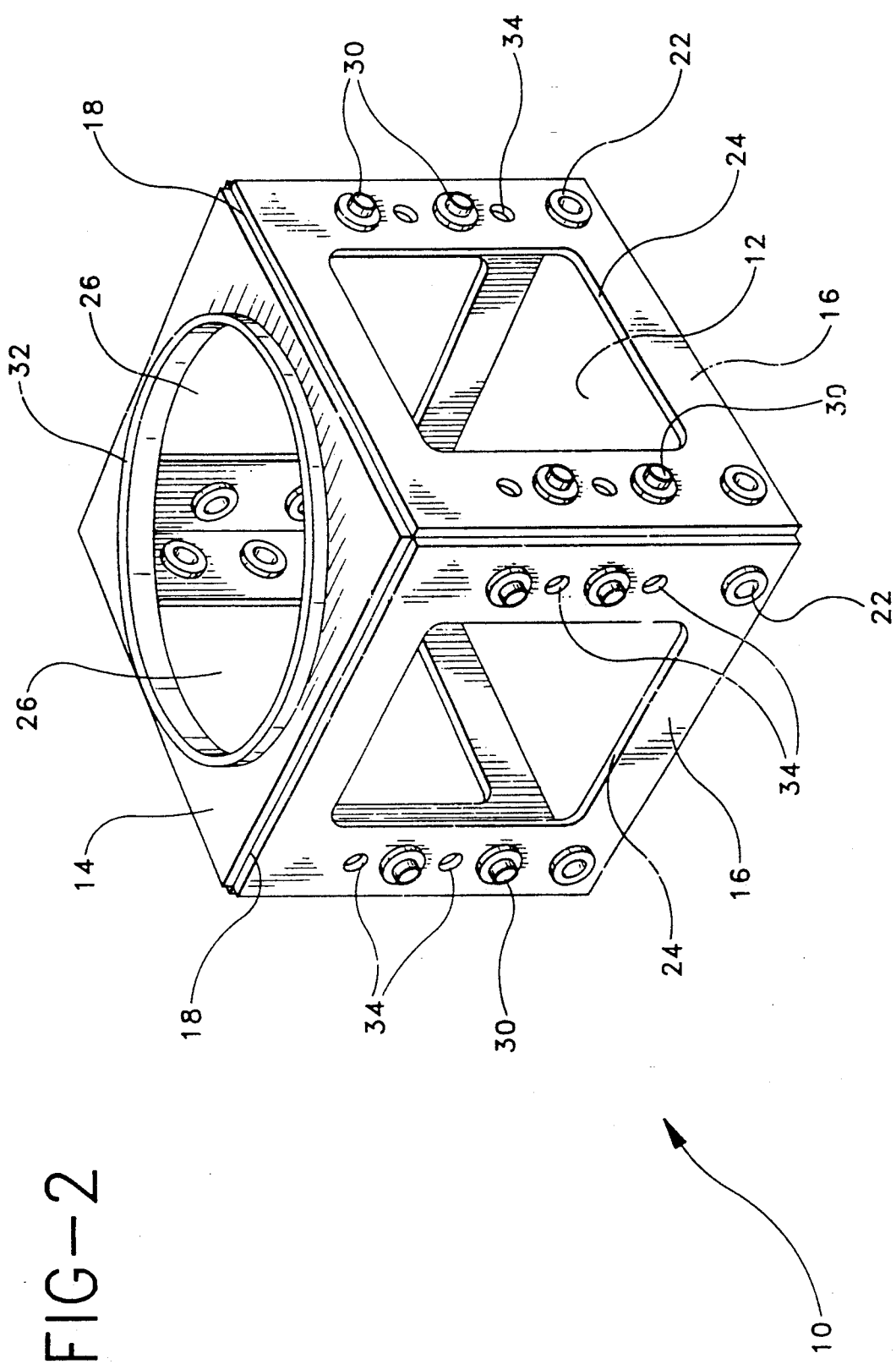
FIG. 2 is a perspective view of the modular unit of FIG. 1 in its erected position for joining with other modular units of the same configuration.

As can be seen in FIGS. 1 and 2, each of the side wall panels 16 have openings 24 therein for reducing the quantity of materials required for making the modular unit 10 and the weight. Moreover, the openings allow for observation of a specimen in the container supported in the modular unit 10.

Each wall 16 contains protuberances or buttons 30 for being snapped into holes 34 in opposed modular units for joining a plurality of such units together.

Figure 3:
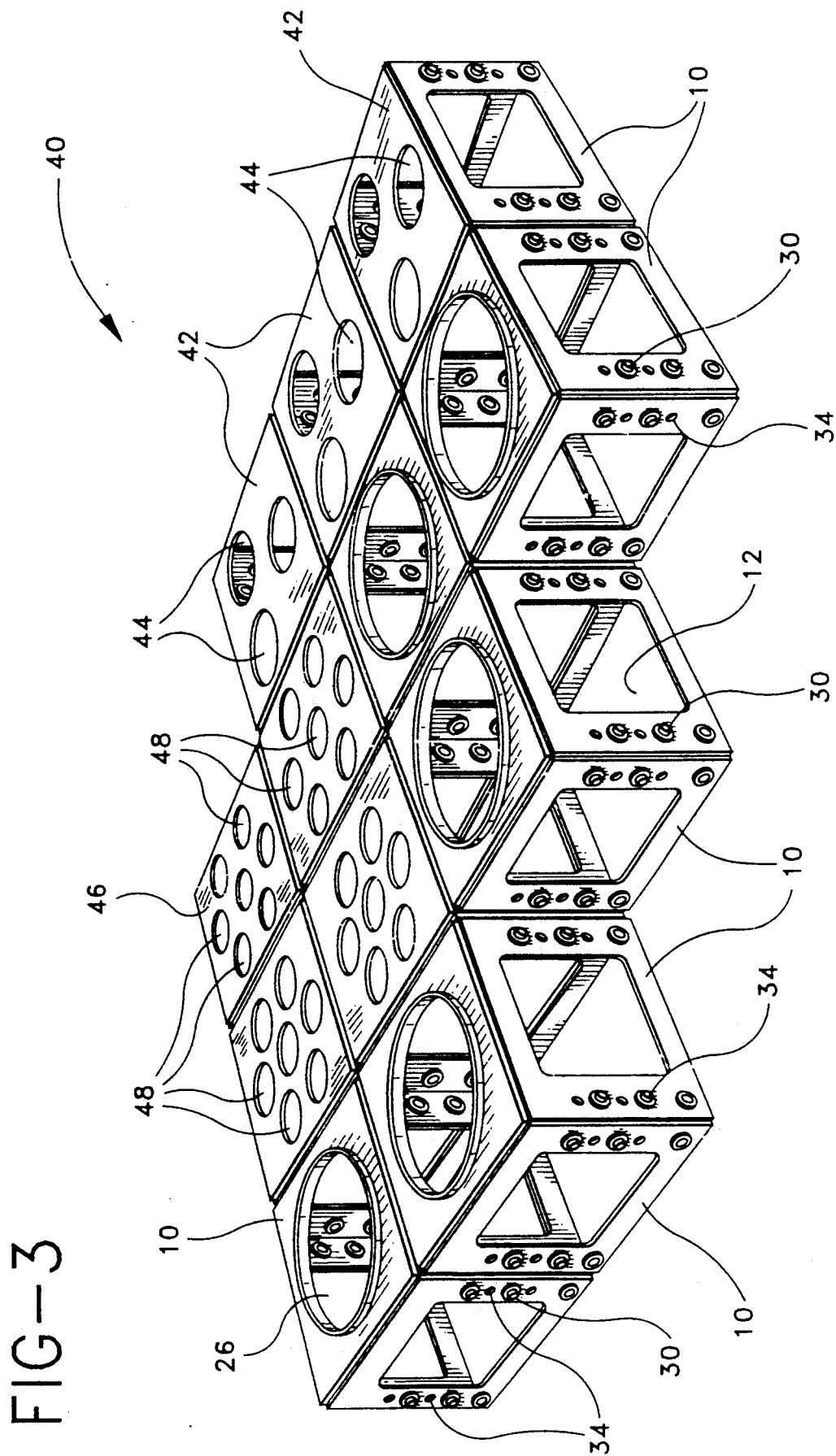
FIG. 3 illustrates one array or arrangement illustrating the invention with a plurality of modular units joined together and illustrating alternative size accommodations of such modular units, in accordance with the invention.

Thus, as can be seen in FIGS. 3, 12 modular units similar to 10 in FIGS. 1 and 2 are joined together to form a laboratory container support array for a plurality of specimens of different sizes received by the laboratory for subsequent handling of some kind. Thus, as shown in FIGS. 3, a plurality of units 10 having larger openings 26 are connected together with units such as 42 having intermediate size diameter openings 44. As will be understood, the bottom panel of units 42 may have seats similar to 28 positioned adjacent the openings 44 for receiving containers of that dimension. However, containers in units 42 may be flat bottomed and merely sit in units 42 for vertical support.

Finally, as shown in FIG. 3, other modular units 46 may be connected together in the array shown, with much smaller dimensioned openings 48 for receiving many more specimen containers. Seven are shown for each unit 46. Again, as will be understood, tubes and/or containers containing specimens and being of a smaller diameter will sit in the individual openings 48 for support and subsequent handling, as discussed above. Further, an arrangement such as 40 shown in FIG. 3, as will be understood from the discussion above, can have a greater or lesser number of modular units joined together, as required by the number of specimens being handled by the individual laboratory technician or as required, for example, by shelf space in an incubator for incubating the specimens and developing the specimens for subsequent examination.

Referring now to FIGS. 4a, 4b and 4c, representative geometric configurations of modular support units of the invention are shown. In FIG. 4a, an array 50 is shown with three separate modular units joined together in an L-shaped configuration. Each modular unit is square and includes one modular unit 10, as described above, one modular unit 42 and one modular unit 46 with each having its own dimensioned opening 26, 44, 46, respectively.

FIG. 4b shows an array 60 with three separate six sided units 62, 66 and 70 joined together with the units being joined on one side 74 of the individual units. In this array 60, six-sided modular units 62 with dimensional openings 64, modular units 66 with one single large opening 68 and modular unit 70 with a plurality of small dimensional openings 72 are joined together in an array for supporting a variety of different dimensioned laboratory containers and/or tubes.

In FIG. 4c, an array 80 is shown. In this arrangement, each modular unit 82, 86 and 90 are eight sided and are joined together by adjacent sides 94 as shown in FIG. 4c. Again, the modular units 82, 86 and 90 include differing size openings 84, 88 and 92 for accommodating different size laboratory specimen containers. Each of the modular units in arrays 50, 60 and 80 have buttons 30 and cooperating holes or openings 34, not shown, for joining the individual units together.

Referring to FIGS. 5a, 5b, 5c and 5d, a different geometry of the unit of the invention is illustrated. Thus, round unit 100 has vertical walls 102 extending from a bottom wall or base plate 112. Centered in plate 112 is an opening or seat 108 with tapered walls 110 for receiving the base of a round specimen container, such as a tube.

Figure 5C:
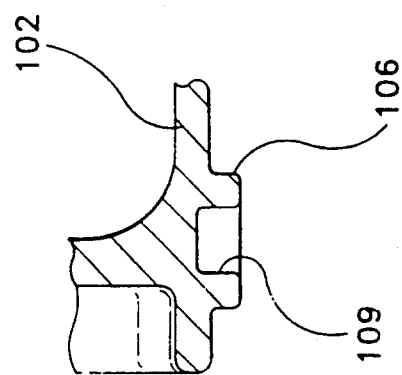
FIGS. 5c and 5d illustrate the snap together arrangement of the modular unit of FIG. 5a for joining together a plurality of such units for an arrangement or array in a laboratory.
Figure 5D:
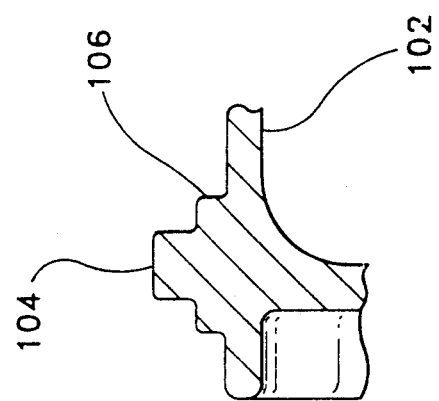

Spaced circumferentially around walls 102 is a plurality of connectors 106 having spaced protuberances 104 for snap insertion into the openings 109 in connectors 106. The details of the snap connections of protuberances 104 and cooperating openings 109 are shown in FIGS. 5c and 5d.

Figure 6:
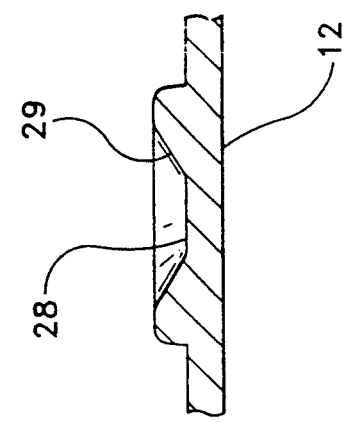
FIG. 6 is a sectional view illustrating one form of seat of a modular unit of the invention for supporting the bottom surface of a tube or container containing a laboratory specimen in accordance with the invention.

FIG. 6 is a sectional view illustrating one seat arrangement 28 which may be positioned below the opening at the top of a modular unit of the invention. As can be seen, the conical surface 29 accommodates conical and/or round bottomed laboratory specimen containers and the containers may be seated in the seat 28 for holding the containers stabilized in a vertical position for subsequent handling by the laboratory technician. Other containers may be flat bottomed and not require stabilized seating, as discussed above.

Thus, as can be seen from above, the arrangement of the invention herein provides for a large variety of selection for a laboratory technician in supporting a great many or a small number of specimen tubes and/or containers of different dimensions and configurations for subsequent examination and/or holding until a specimen is examined for one reason or another in the laboratory.

The individual modular units may be made in a single flat sheet form with a thickness range which allows for packaging many such units in a carton for shipping and subsequent erection by the user. Moreover, because of the more or less universal arrangement, the user may erect a great many such modular units and join them together rapidly or a very small number depending upon the requirements of the user.

As purely illustrative of the materials and configurations, multiple flat panels forming a modular unit of the invention may be within the range of between about 0.03 and 0.12 inches in thickness. The modular unit may be, for example, within the range of between about 2 and 4 inches across and within the range of between about 1 and 3 inches in height. It should be understood, however, that the modular arrangement is such that these dimensions may be varied to accommodate the user's requirements. In addition, the individual access holes in the top surfaces of the modular units may have a vertical lip, for example, such as 32 shown in FIG. 2 which has the effect of increasing the vertical support required for certain containers.

As purely illustrative of a material which may be utilized for making the units of the invention, injection molded polypropylene may be utilized. Materials may be selected which will provide, as discussed above, tolerance for repeated autoclaving. Moreover, materials may be selected which provide better chemical resistance, depending upon the materials being utilized to examine the specimens involved. Also, if the modular units are to be used for supporting laboratory specimens at elevated temperatures or at freezing temperatures, the materials will be selected for this reason.

While the forms of apparatus herein described constitute preferred embodiments of the invention, it is to be understood that the invention is not limited to these precise forms of apparatus, and that changes may be made therein without departing from the scope of the invention which is defined in the appended claims. For example, whereas the individual units such as that shown in FIG. 1 show the panels being joined together by a "living hinge." It will be understood that the individual panels may be joined together physically by a snap connection in the same manner as the individual units are joined together, in accordance with this invention.

What is claimed is:

1. A clinical laboratory rack unit for joining into an array of several such units to contain a plurality of laboratory specimen containers, comprising
    (a) a flat bottom wall;
    (b) a flat top wall;
    (c) at least one vertical wall joining said bottom wall and said top wall;
    (d) at least one opening in said top wall for receiving a container in said rack unit;
    (e) a plurality of spaced protuberances along said vertical wall; and
    (f) a plurality of spaced holes along said vertical wall
    (g) whereby insertion of at least one of said protuberances into at least one of said holes in an adjacent rack unit provides an array of rack units for receiving laboratory specimen containers therein.

2. The unit of claim 1, wherein said vertical wall is circular to form a circular unit.

3. The unit of claim 1, wherein said top wall has several openings.

4. The unit of claim 1, wherein said vertical wall comprises four walls extending from said bottom wall to said top wall and said four walls are at right angles to each other to form a square rack unit.

5. The unit of claim 4, wherein each of said four walls has an opening positioned centrally therein for viewing a container in said unit.

6. The unit of claim 1, further comprising:
    (h) a container seat positioned centrally of said flat bottom wall for receiving the bottom surface of a container in said rack unit.

7. A flat foldable form for erection into a square rack unit for joining an array of several such units to contain a plurality of laboratory specimen containers, comprising
    (a) a flat square bottom wall;
    (b) a flat square top wall;
    (c) a side wall connected to each side of said flat square top wall;
    (d) said bottom wall extending from one of said side walls on the side opposite said top wall;
    (e) first hinge means connecting each of said side walls to one edge of said flat square top wall;
    (f) second hinge means connecting said bottom wall to said one of said side walls;
    (g) connection means on each of said side walls and said bottom wall for connecting said bottom wall to each of said side walls in the erected position of said rack unit;
    (h) at least one opening in said top wall for receiving a container therein;
    (i) at least one protuberance on each of said side walls; and
    (j) at least one hole on each of said side walls;
    (k) whereby insertion of at least one of said protuberances into at least one of said holes in an adjacent rack unit provides an array of rack units for receiving laboratory specimen containers therein.

8. The unit of claim 7, wherein said top wall has several openings.

9. The unit of claim 7, wherein each of said side walls has an opening positioned therein for viewing said containers positioned therein.

10. The unit of claim 7 further comprising:
    (l) a container seat is positioned centrally of said flat bottom wall for a container in said rack unit.

* * * * *